Patented Oct. 6, 1925.

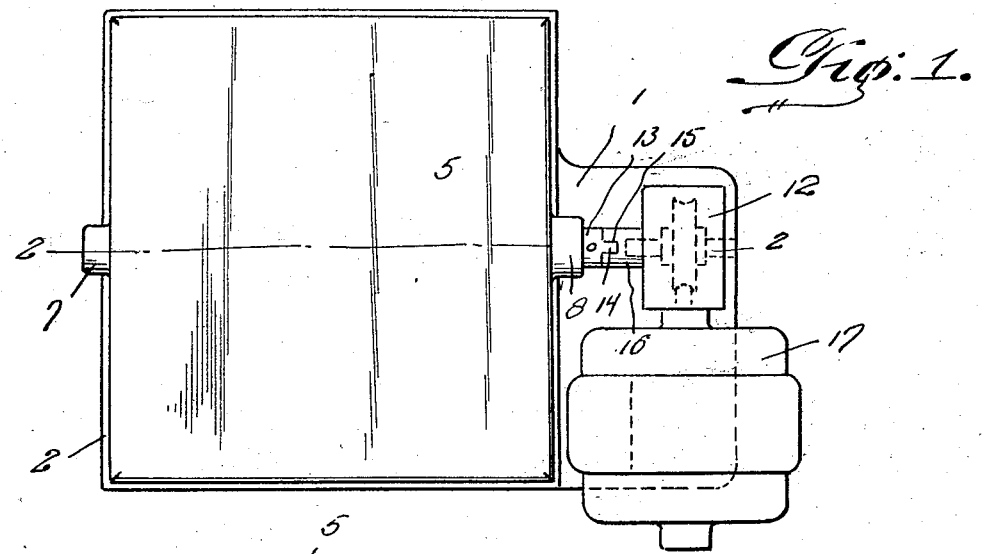
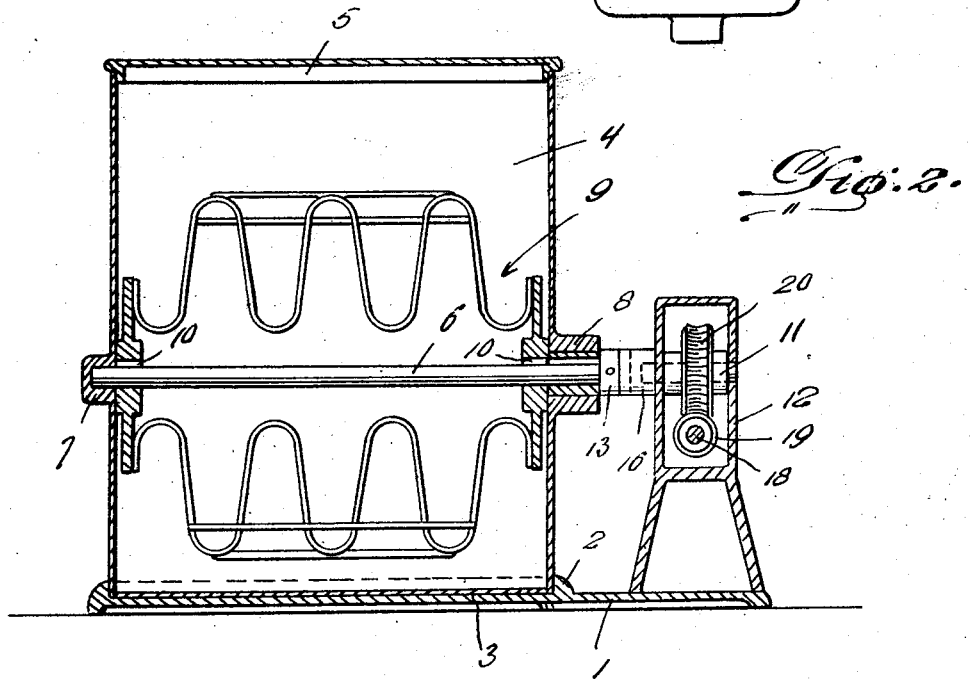

1,556,445

UNITED STATES PATENT OFFICE.

JOHN G. KOOKOOTSEDES, OF SIDNEY, OHIO.

CREAM-WHIPPING APPARATUS.

Application filed December 19, 1924. Serial No. 756,916.

*To all whom it may concern:*

Be it known that I, JOHN G. KOOKOOTSEDES, a citizen of Greece, residing at Sidney, in the county of Shelby and State of Ohio, have invented certain new and useful Improvements in a Cream-Whipping Apparatus, of which the following is a specification.

This invention relates to improvements in agitators, and has for its principal object to provide an apparatus which is particularly adapted to be used at soda fountains, restaurants and the like for the purpose of whipping cream.

One of the important objects of the present invention is to provide a cream whipping apparatus which is electrically operated, thereby saving considerable time and labor, and furthermore causing the cream to be whipped in an efficient manner.

A further object of the invention is to provide a cream whipping apparatus of the above mentioned character, wherein the same is of such construction as to enable the several parts to be readily disassembled for cleaning purposes, thus promoting sanitation.

A still further object is to provide a cream whipping apparatus of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a top plan view, and

Figure 2 is a sectional view taken approximately on line 2—2 of Figure 1.

In the drawing, wherein for the purpose of illustration is shown the preferred embodiment of my invention, the numeral 1 designates the base, the upper face thereof being provided with the upstanding rim or ledge 2 whereby a pocket of substantially rectangular shape is formed, the same being indicated at 3. A substantially rectangular receptacle 4 which is open at its top is adapted to be removably supported within the pocket 3 on the base 1. When the receptacle is positioned within the pocket 3, the same is held in a substantially rigid position on the base. A cover 5 is detachably associated with the open top of the receptacle.

A beater shaft 6 extends transversely through the opposed sides of the receptacle at the center thereof, one end of the shaft being journaled in a suitable bearing 7 associated with the outer side of the receptacle, the inner end of the beater shaft being journaled within a bearing 8 associated with the inner side of a receptacle and extending beyond or outwardly of the inner side of the receptacle as clearly illustrated in the drawing.

A beater designated generally by the numeral 9 of any well known construction is detachably keyed on the beater shaft 6 through the medium of the keys 10, whereby the beater will rotate within the receptacle for whipping the cream placed therein when the beater shaft is driven in the manner to be presently described.

Supported in alignment with the beater shaft 6 is a drive shaft 11, the same being journaled at its respective ends in a suitable housing 12 which is supported at one end of the base. A head 13 is detachably secured on the inner end of the driven beater shaft 6 and the same is provided with a tang 14 which is slidably received in the slot 15 provided therefor in the head 16 which is secured on the adjacent end of the drive shaft.

This connection provides a means whereby the beater shaft will be rotated for facilitating the operation of the beater member.

An electric motor 17 of any conventional construction is supported on the base 1 adjacent the housing 12 and the drive shaft 18 of the motor has a worm 19 carried on the outer end thereof and adapted to engage the worm gear 20 which is secured on the drive shaft 11 and is disposed within the housing 12. With the parts arranged as shown in the drawing, the cream placed within the container will be efficiently and quickly whipped.

When it becomes necessary to disassemble the apparatus in order that the same may be cleaned, the heads 13 and 16 on the adjacent ends of the driven and drive shafts respectively are rotated until the tang and slots are disposed in a vertical position. The receptacle 4 is then raised upwardly out of the pocket 3 causing the tang 14 to slide upwardly within the slot 15 until the tang has been entirely disengaged from the slot. The head 13 is then detached from the inner end of the beater shaft so that the key associated with the shaft adjacent the inner side of the receptacle may be removed. The key at the opposite side is also adapted to be removed whereby the shaft 6 is disengaged from the beater and is adapted to be removed from the receptacle. The beater 9 may then be removed from the receptacle and then all of the parts are arranged in disassembled relation so that the same may be easily and efficiently cleaned.

It will thus be seen from the foregoing description, that an agitating apparatus has been provided which may be readily assembled or disassembled and when in an operative position, will enable cream to be whipped in such a manner as to save considerable time and labor.

While I have shown the preferred embodiment of my invention, it is to be understood that various changes in the size, shape and arrangement of parts may be resorted to without departing from the spirit of the invention and the scope of the appended claim.

Having thus described my invention, what I claim is:

In an apparatus of the class described, a base, a prime mover mounted on the base, a drive shaft operatively associated with the prime mover, a continuous ledge formed on the base to provide a pocket, a receptacle seated in the pocket and capable of being twisted out of the pocket, a shaft journaled in opposite sides of the receptacle and slidable through and extending through one side of the receptacle, said second shaft in alignment with the drive shaft, one of said shafts provided with a projection, and the other shaft provided with a slot for receiving the projection, whereby the receptacle may be lifted from the pocket to disalign the shaft, so that the second mentioned shaft may be slid out of the receptacle, and an agitator mounted on the second shaft within the receptacle to be rotated by the second shaft, said second shaft being slidable out of engagement with the agitator.

In testimony whereof I affix my signature.

JOHN G. KOOKOOTSEDES.